United States Patent
Mani

(10) Patent No.: US 7,031,447 B2
(45) Date of Patent: Apr. 18, 2006

(54) SYSTEM AND METHOD FOR LOCATION-BASED CALL DISTRIBUTION

(75) Inventor: Babu V. Mani, Plano, TX (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 10/192,415

(22) Filed: Jul. 10, 2002

(65) Prior Publication Data

US 2004/0008836 A1    Jan. 15, 2004

(51) Int. Cl.
H04M 3/42 (2006.01)
H04M 3/523 (2006.01)
H04Q 7/20 (2006.01)

(52) U.S. Cl. ............. 379/201.06; 379/207.12; 379/265.01; 379/265.11; 379/912; 379/913; 455/445; 455/456.2; 455/456.3

(58) Field of Classification Search ......... 379/201.06, 379/265.01, 265.02, 265.11, 266.09, 912, 379/913, 207.12; 455/445, 461, 456.01, 455/456.02, 456.03
See application file for complete search history.

(56) References Cited

U.S. PATENT DOCUMENTS 6,272,347 B1 * 8/2001 Griffith et al. ............. 455/445
6,466,798 B1 * 10/2002 Ayala et al. ................ 455/461

FOREIGN PATENT DOCUMENTS

EP    0905956 A2    3/1999

* cited by examiner

Primary Examiner—Harry S. Hong
(74) Attorney, Agent, or Firm—Robert H. Kelly; Bobby D. Slaton; V. Lawrence Sewell

(57) ABSTRACT

A method for location-based call distribution is provided that includes receiving from a customer communication device a request to establish a communication session with an agent communication device based on a specified telephone number. An agent database is searched for the specified telephone number. Location data corresponding to the specified telephone number is retrieved from the agent database when the specified telephone number is found in the agent database. The customer communication device is located. The agent communication device that is nearest to the customer communication device is located based on the retrieved location data. A communication session is established between the customer communication device and the nearest agent communication device.

9 Claims, 4 Drawing Sheets

| | Station ID /102 | Location Data /104 | Add₁ /106a | | Add_N /106b |
|---|---|---|---|---|---|
| 108a | 972-555-4973 | 1F | None | | All |
| 108b | 972-555-6019 | 3B | Spanish | | AC |
| 108c | 972-555-0704 | 7G | None | | Electrical |
| | ⋮ | ⋮ | ⋮ | | ⋮ |
| 108d | 214-555-3892 | 8A | Japanese | | Plumbing |
| 108e | 214-555-7775 | 8C | None | | All |

SYSTEM AND METHOD FOR LOCATION-BASED CALL DISTRIBUTION

The present invention relates generally to communication systems and, more particularly, to a method and system for location-based call distribution, in a mobile communication network.

BACKGROUND OF THE INVENTION

Communication through the use of telephonic communication systems is an important aspect of modern society. Telephonic networks of various telephonic communication systems have been installed throughout significant portions of the populated areas of the world. Telephonic stations are connected to the telephonic network, such as by a wireline connection or a radio interface. A communication session is formed between two or more of the telephonic stations connected to the telephonic network. The telephonic station at which a call is originated may be referred to as the calling party, and the telephonic station at which the call is to be completed, or terminated, may be referred to as the called party.

In most conventional telephonic communication systems, circuit-switched connections are provided between endpoints, i.e., the calling and called parties, during a communication session. When a circuit-switched connection is formed, a dedicated channel is provided to permit the telephonic communications between the telephonic stations that form the endpoints of the communication sessions. For so long as the connection is maintained, telephonic communications between the calling and called parties are permitted. As the data to be communicated pursuant to the communication session might only be communicated intermittently, the communication capacity of the telephonic communication system may not be fully utilized for much of the communication session. Thus, in general, use of circuit-switched connections results in inefficient utilization of the communication capacity of a telephonic network.

Packet-switched communications, in contrast, are able more efficiently to utilize the communication capacity of a communication system. In a packet-based communication system, a common data path can be shared by two or more separate communication sessions. Because packet-formatted data can be communicated during discrete intervals, the same data path can be utilized during separate time periods to communicate packet-formatted data for different communication sessions. More efficient utilization of the communication capacity of the communication system in which the packet-based communication scheme is implemented is thereby possible.

Various packet formatting protocols are used when forming and sending data packets formed of digital data bits. One protocol scheme, the Internet protocol (IP) is regularly utilized in many different communication systems and communication applications. Communication devices constructed to send, receive, transport, and operate upon IP-formatted data can be configured together in a communication system to provide for the communication of IP-formatted data.

The Internet is an example of a packet-based communication system. Data communicated by way of the Internet is formatted into packets and sent during discrete intervals. Typically, the packets are IP-formatted and include a header portion and a payload portion. The header portion contains the identity of the intended destination of the packet in the form of an IP address that identifies the device to which the data packets are to be delivered.

Computer stations connected to conventional packet data networks, such as the Internet, are sometimes configured to provide telephonic communication. A call is routed through the packet data network, and the data that is communicated pursuant to a telephonic communication session can be formed of voice, as well as other, data. In this situation, the computer station that is being used as a telephonic endpoint forms a telephonic station.

With these types of currently existing communication systems, businesses with multiple agents available to respond to incoming calls from customers typically forward the calls to the agents using manual dispatching or based on an assumed fixed location for the agent. Thus, either a dispatcher is used to determine in some manner which agent is to receive the call or an automatic dispatch may be provided based on the assumed fixed location.

Accordingly, while manual routing of the incoming calls is possible, such manual procedures are prone to human error. And, manual routing is inherently inefficient and, as a result, also costly.

A manner by which to route the incoming calls in a more efficient manner would therefore be advantageous.

It is in light of this background information related to communications in a telephone communication system that the significant improvements of the present invention have evolved.

SUMMARY OF THE INVENTION

In accordance with the present invention, a method and system for location-based call distribution are provided that substantially eliminate or reduce disadvantages and problems associated with conventional systems and methods. In particular, a communication system is provided that is operable to automatically dispatch calls from customers to agents based on the agents' locations as determined by the locations of the agents' corresponding wireless communication devices.

According to one embodiment of the present invention, a method for location-based call distribution is provided that includes receiving from a customer communication device a request to establish a communication session with an agent communication device based on a specified telephone number. An agent database is searched for the specified telephone number. Location data corresponding to the specified telephone number is retrieved from the agent database when the specified telephone number is found in the agent database. The customer communication device is located. The agent communication device that is nearest to the customer communication device is located based on the retrieved location data. A communication session is established between the customer communication device and the nearest agent communication device.

According to another embodiment of the present invention, a system for location-based call distribution is provided that includes a plurality of agent communication devices, at least one customer communication device, and a network. The network is coupled to the agent communication devices. The network comprises a softswitch, an application server coupled to the softswitch, and an agent database coupled to the application server. The application server comprises a location monitor and a distributor. The location monitor and the distributor are each operable to be invoked by the softswitch. The location monitor is operable to receive locating information from the agent communication devices, to generate location data based on the locating information, and to store the location data in the agent database when invoked. The distributor is operable to access the agent database in order to identify a specified agent communication device based on the location data and to route an incoming call from the customer communication device to the specified agent communication device.

Technical advantages of one or more embodiments of the present invention include providing an improved communication system. In a particular embodiment, a communication system routinely monitors the locations of a plurality of agents' wireless communication devices. As a result, when an incoming customer call is received, the communication system may automatically route the call to the nearest agent based on the previously determined locations of the wireless communication devices. In addition, for one embodiment of the present invention, the calls may also be routed based on certain capabilities of the agents, such as language skills and technical abilities, together with location information.

Other technical advantages will be readily apparent to one skilled in the art from the following figures, description, and claims.

BRIEF DESCRIPTION OF THE DRAWINGS

For a more complete understanding of the present invention and its advantages, reference is now made to the following description taken in conjunction with the accompanying drawings, wherein like reference numerals represent like parts, in which:

FIG. 2 is a table illustrating data that may be stored in the agent database of FIG. 1 in accordance with one embodiment of the present invention;

DETAILED DESCRIPTION

Figure 1:
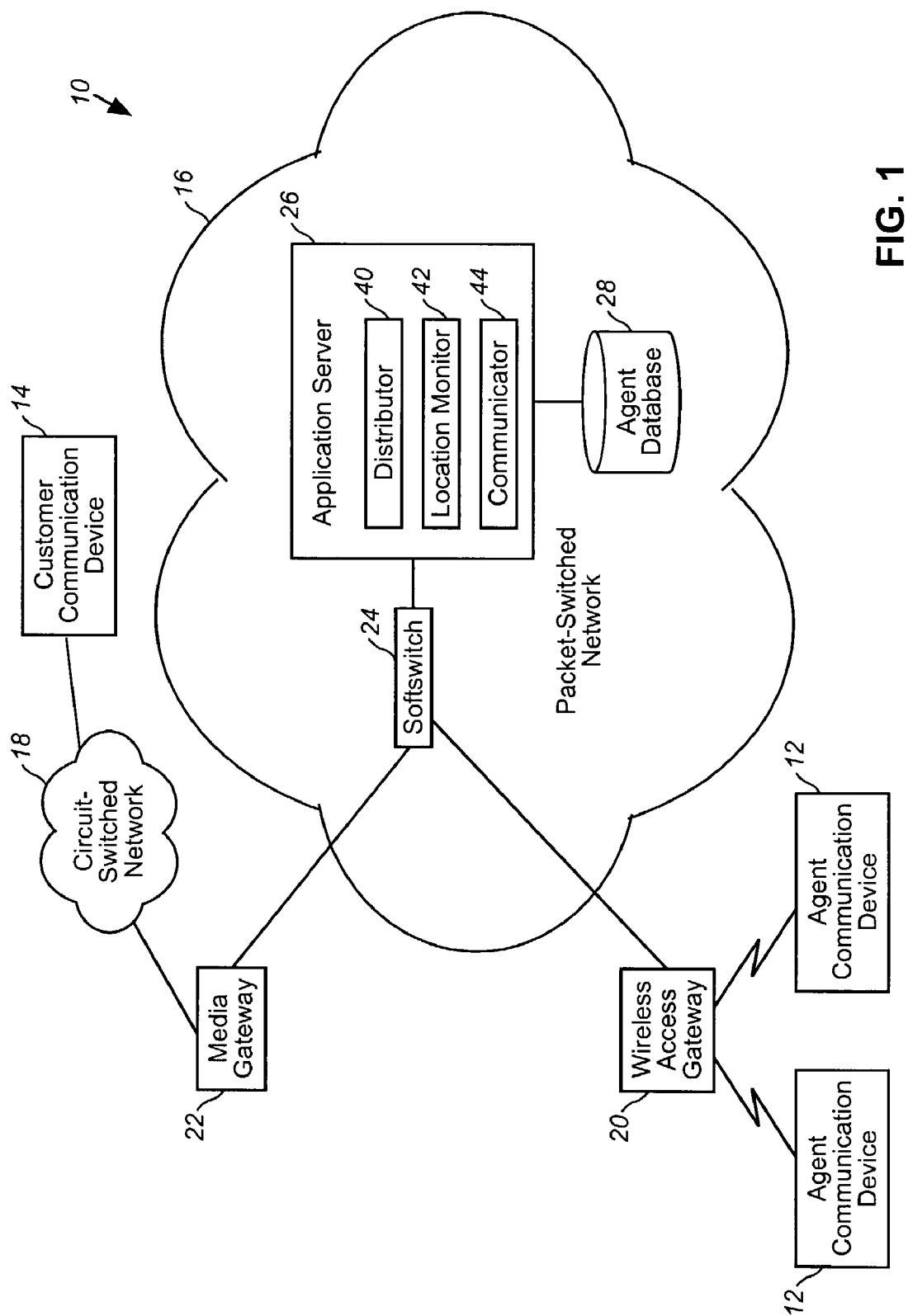
FIG. 1 is a block diagram illustrating a communication system operable to provide location-based call distribution in accordance with one embodiment of the present invention.

FIG. 1 is a block diagram illustrating a communication system 10 operable to provide location-based call distribution in accordance with one embodiment of the present invention. The communication system 10 may comprise a telephonic or other suitable communication system that is operable to provide communication between two or more communication devices. The communication system 10 comprises a plurality of agent communication devices 12 and customer communication devices 14, a communication network 16 that is operable to provide communication services for the communication devices 12 and 14, and a circuit-switched network 18 that is operable to provide communication services for the customer communication devices 14. In the exemplary implementation, the network 16 forms a packet-switched network. In other implementations the network is of an other implementation. And, also, while the customer communication device is, in the exemplary implementation, connected by way of the circuit-switched network, in other implementations, the device 14 is connected directly to the network 16, here indicated by the line 19, shown in dash.

The agent communication devices 12 coupled to the communication network 16 comprise wireless terminals or any other suitable packet-network communication devices. The agent communication devices 12 may be coupled to the packet-switched network 16 through a wireless access gateway 20. The customer communication devices 14 coupled to the circuit-switched network 18 may comprise landline telephones, wireless telephones and/or any other suitable time-domain-multiplexing network communication devices. The customer communication devices 14 may also comprise any suitable packet-network communication devices coupled to the communication network 16 through the wireless access gateway 20.

According to one embodiment, the communication network 16 may comprise the Internet backbone or any other suitable type of packet-switched network, either public or private. The circuit-switched network 18 is operable to provide circuit-switched connections between customer communication devices 14. The networks 16 and 18 are coupled to each other through a media gateway 22.

The communication network 16 comprises a softswitch 24, an application server 26, and an agent database 28. The communication network 16 may also comprise a media server, a billing server, a policy decision point, operations support systems and/or any other suitable network components (not illustrated in FIG. 1).

The softswitch 24 may be coupled to a plurality of gateways such as gateways 20 and 22, in addition to one or more communication devices. In the illustrated embodiment, the softswitch 24 is also coupled to the application server 26. In an alternative embodiment, the softswitch 24 may comprise the application server 26. Similarly, the application server 26 is coupled to the agent database 28 in the illustrated embodiment; however, in an alternative embodiment, the application server 26 may comprise the agent database 28.

It will be understood that the softswitch 24, the application server 26 and the agent database 28 may be coupled to each other through packet-switched networks without departing from the scope of the present invention. In addition, it will be understood that the softswitch 24 may comprise one or more softswitches, the application server 26 may comprise one or more application servers, and the agent database 28 may comprise one or more databases, any one or more of which may be coupled to each other through packet-switched networks, without departing from the scope of the present invention.

One or more customer communication devices 14 may be coupled to the softswitch 24 through the circuit-switched network 18 and the media gateway 22. In addition, one or more customer communication devices 14 may be coupled to the softswitch 24 through the wireless access gateway 20.

The softswitch 24 may be operable to control connection services for the media gateway 22, to select processes that may be applied to a call, to route a call based on signaling information and customer information, to transfer a call between network elements, such as from a media server to a gateway 20 or 22, and to interface to and support management functions, such as provisioning, fault management, billing, and the like.

The application server 26 is operable to support functions such as number translation, re-routing calls based on any suitable criteria, and the like. According to one embodiment, the application server 26 is also operable to communicate with the softswitch 24 using SIP or other appropriate protocol or interface.

The application server 26 comprises a distributor 40, a location monitor 42 and an optional communicator 44. The softswitch 24 is operable to invoke applications in the application server 26, such as the distributor 40, the location monitor 42, the communicator 44 and any other suitable applications in the application server 26 operable to provide communication services for the communication network 16.

As described in more detail below, the distributor 40 is operable to access the agent database 28 in order to identify an agent communication device 12 based on location and to route an incoming call from a customer communication device 14 to the identified agent communication device 12. The distributor 40 may also be operable to receive locating information from customer communication devices 14 and to generate location data based on the locating information.

The location monitor 42 is operable to request and/or receive locating information from agent communication devices 12, to generate location data based on the locating information, and to store the location data in the agent database 28. According to one embodiment, the location monitor 42 may also be operable to sort the data stored in the agent database 28 based on the location data. In addition, as an alternative to the distributor 40 receiving locating information from customer communication devices 14 and generating location data based on the locating information, the location monitor 42 may receive the locating information from the customer communication devices 14 and generate location data based on the locating information. In this embodiment, the location monitor 42 may provide the location data for the customer communication devices 14 to the distributor 40 for use in identifying the appropriate agent communication device 12.

The communicator 44 is operable to respond to an incoming call from a customer communication device 14 by providing an automated menu of selections. For example, the communicator 44 may prompt the user of the customer communication device 12 to select a language, such as English or Spanish, to select a reason for the call, such as plumbing problems or electrical problems for a house repair service company, and/or to select any other suitable options which may be used to better route the call on additional data other than the location.

As described in more detail below, the agent database 28 may comprise any suitable data store operable to store location data, in addition to other relevant information, regarding a plurality of agent communication devices 12.

Any or all of the gateways 20 and 22, the softswitch 24, and the application server 26 may comprise logic encoded in media. The logic comprises functional instructions for carrying out program tasks. The media comprises computer disks or other computer-readable media, application-specific integrated circuits (ASICs), field-programmable gate arrays (FPGAs), digital signal processors (DSPs), other suitable specific or general purpose processors, transmission media or other suitable media in which logic may be encoded and utilized.

In operation, a plurality of agent communication devices 12 communicate with the communication network 16 through the wireless access gateway 20 and the softswitch 24. The location monitor 42 of the application server 26 monitors the agent communication devices 12 for location transactions. The location transactions comprise events that are operable to trigger the location monitor 42 to determine the location of the agent communication device 12 and to store corresponding location data in the agent database 28. For example, location transactions may comprise the agent communication device 12 being powered on, the agent communication device 12 receiving a call, the agent communication device 12 placing a call, the agent communication device 12 sending a periodic location message to the location monitor 42, a timer for the location monitor 42 expiring causing a location query message to be generated by the location monitor 42 and a response to be provided by the agent communication device 12 and/or any other suitable event.

After detecting a location transaction for any of the agent communication devices 12, the location monitor 42 may retrieve location data from the location transaction or may generate location data in response to the location transaction. For example, if a location transaction comprises a self-locating location transaction that results in the agent communication device 12 sending a message to the location monitor 42 identifying the location of the agent communication device 12, the location monitor 42 may simply retrieve the location data from the message. Alternatively, the location monitor 42 may locate the agent communication device 12 based on any suitable locating method for wireless communication devices and generate the location data based on the identified location of the agent communication device 12. The location monitor 42 then stores the location data in the agent database 28 for use by the distributor 40.

When a customer using a customer communication device 14 calls a business number corresponding to the business which employs the agents using the agent communication devices 12, the call is routed to the application server 26 either through the wireless access gateway 20 and the softswitch or through the circuit-switched network 18, the media gateway 22 and the softswitch 24. For one embodiment, the communicator 44 prompts the customer for information, such as language preferences, the reason for the call and/or any other suitable information.

The distributor 40 either locates the customer communication device 14 or prompts the location monitor 42 to locate the customer communication device 14. The distributor 40 then accesses the agent database 28 and searches for the nearest agent communication device 12 that is able to handle the call. For the embodiment in which the communicator 44 is used, the distributor 40 searches for the nearest agent communication device 12 that meets the specified criteria provided by the customer. The distributor 40 then routes the call to the identified agent communication device 12.

FIG. 2 is a table 100 illustrating data that may be stored in the agent database 28 in accordance with one embodiment of the present invention. Although the data is illustrated as being stored in a table, it will be understood that the data may be otherwise suitably stored in the agent database 28 without departing from the scope of the present invention.

The table 100 is operable to store distribution data that may be used by the distributor 40 to route incoming calls. Each table 100 stored in the agent database 28, or each section of one or more tables 100, may be identified by a specified telephone number corresponding to a particular business enterprise that uses location-based call distribution. According to one embodiment, the distribution data stored in the table 100 comprises a station identifier 102, location data 104, and optional additional distribution data (ADD) 106. It will be understood that the distribution data may comprise any other suitable information without departing from the scope of the present invention. While the table 100 illustrates exemplary data values contained therein, more generally, station identifier, location data, and additional distribution data each include entries 1–n, i.e., each column of the table is of length n.

In the illustrated embodiment, the distribution table 100 comprises an agent entry 108 for each agent carrying an agent communication device 12. Each agent entry 108 comprises a station identifier 102 operable to identify the agent communication device 12. In the exemplary implementation, the agent identifiers are numbers to which listed directory numbers (LDNs) are mapped by a call distribution system. For example, the station identifier 102 may comprise a telephone number corresponding to the agent communication device 12 carried by the agent associated with the agent entry. It will be understood that the station identifiers 102 may be stored in any suitable format. For example, the station identifiers 102 may comprise numerical values or any other suitable identifiers.

Each agent entry 108 also comprises location data 104 that is operable to indicate the location of the agent communication device 12 as of the most recent location determination performed by the location monitor 42. The location data 104 may be stored in any suitable format. For example, the location data 104 may comprise alphanumerical values corresponding to horizontal and vertical locators on a grid map or any other suitable data operable to provide a location for the agent communication device 12.

Each agent entry 108 may also comprise additional distribution data 106 that is operable to be used to better route incoming calls based on information other than location. For example, the additional distribution data 106 may comprise language data 106a that is operable to identify one or more languages spoken by the agent associated with the agent communication device 12. In the illustrated embodiment, the language data 106a for the agent entry 108b indicates that the associated agent speaks Spanish, in addition to English.

As another example, the additional distribution data 106 may comprise ability data 106b that is operable to identify one or more abilities of the agent associated with the agent communication device 12. In the illustrated embodiment, the ability data 106b for the agent entry 108c indicates that the associated agent is able to handle calls related to electrical problems, the ability data 106b for the agent entry 108d indicates that the associated agent is able to handle calls related to plumbing problems, and the ability data 106b for the agent entry 108e indicates that the associated agent is able to handle calls related to any problems, including electrical, plumbing, air conditioning, and any other types of problems handled by the business using the location-based call distribution.

In the illustrated embodiment, both the language data 106a and the ability data 106b comprise text. However, it will be understood that the additional distribution data 106 may be stored in any suitable format, as well as in multiple formats based on which type of distribution data is being stored. For example, the language data 106a may comprise text, while the ability data 106b comprises numerical values, or vice versa.

Figure 3:
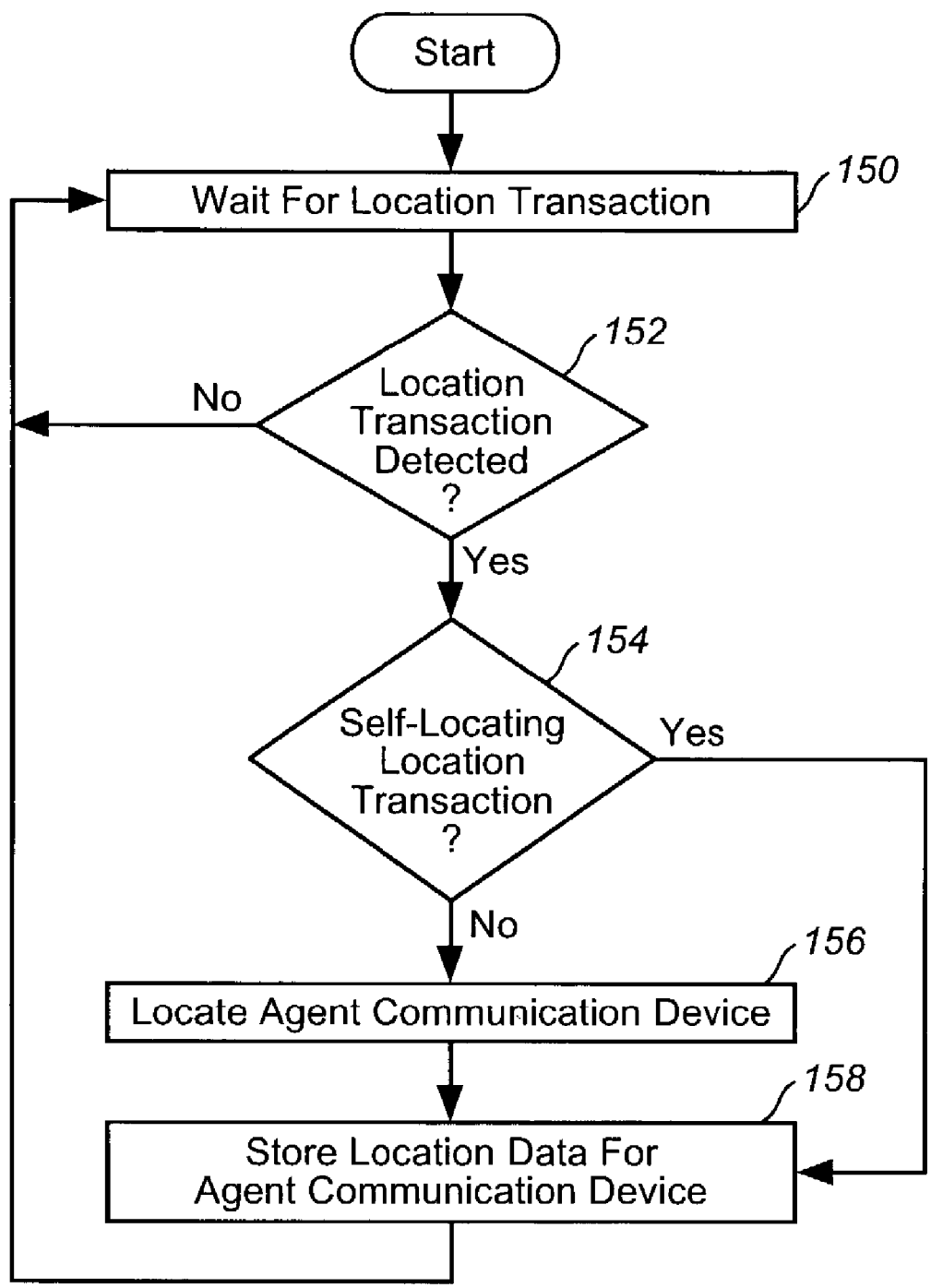
FIG. 3 is a flow diagram illustrating a method for monitoring the locations of the agent communication devices of FIG. 1 in accordance with one embodiment of the present invention.

FIG. 3 is a flow diagram illustrating a method for monitoring the locations of the agent communication devices 12 in accordance with one embodiment of the present invention. The method begins at step 150 where the location monitor 42 waits for a location transaction. At decisional step 152, the location monitor 42 makes a determination regarding whether or not a location transaction has been detected. If no location transaction has been detected, the method follows the No branch and returns to step 150 where the location monitor 42 continues to wait for a location transaction. However, if a location transaction has been detected, the method follows the Yes branch from decisional step 152 to decisional step 154.

At decisional step 154, the location monitor 42 makes a determination regarding whether or not the detected location transaction comprises a self-locating location transaction. If the detected location transaction does not comprise a self-locating location transaction, the method follows the No branch from decisional step 154 to step 156. At step 156, the location monitor 42 locates the agent communication device 12 associated with the location transaction. The method then continues to step 158.

Returning to decisional step 154, if the detected location transaction comprises a self-locating location transaction, the method follows the Yes branch from decisional step 154 to step 158. At step 158, the location monitor 42 stores in the agent database 28 the location data 104 for the agent communication device 12 that was either included in a self-locating location transaction or that was generated by the location monitor 42 while locating the agent communication device 12. At this point, the method returns to step 150 where the location monitor waits for another location transaction.

Updating of the agent location can be implemented in any desired manner. Automatic detection, for instance, can be used based upon calls originating or terminating to the agents. Or, periodic notification by the agent communication devices can be used. And, polling of the agent communication devices can also be used.

Figure 4:
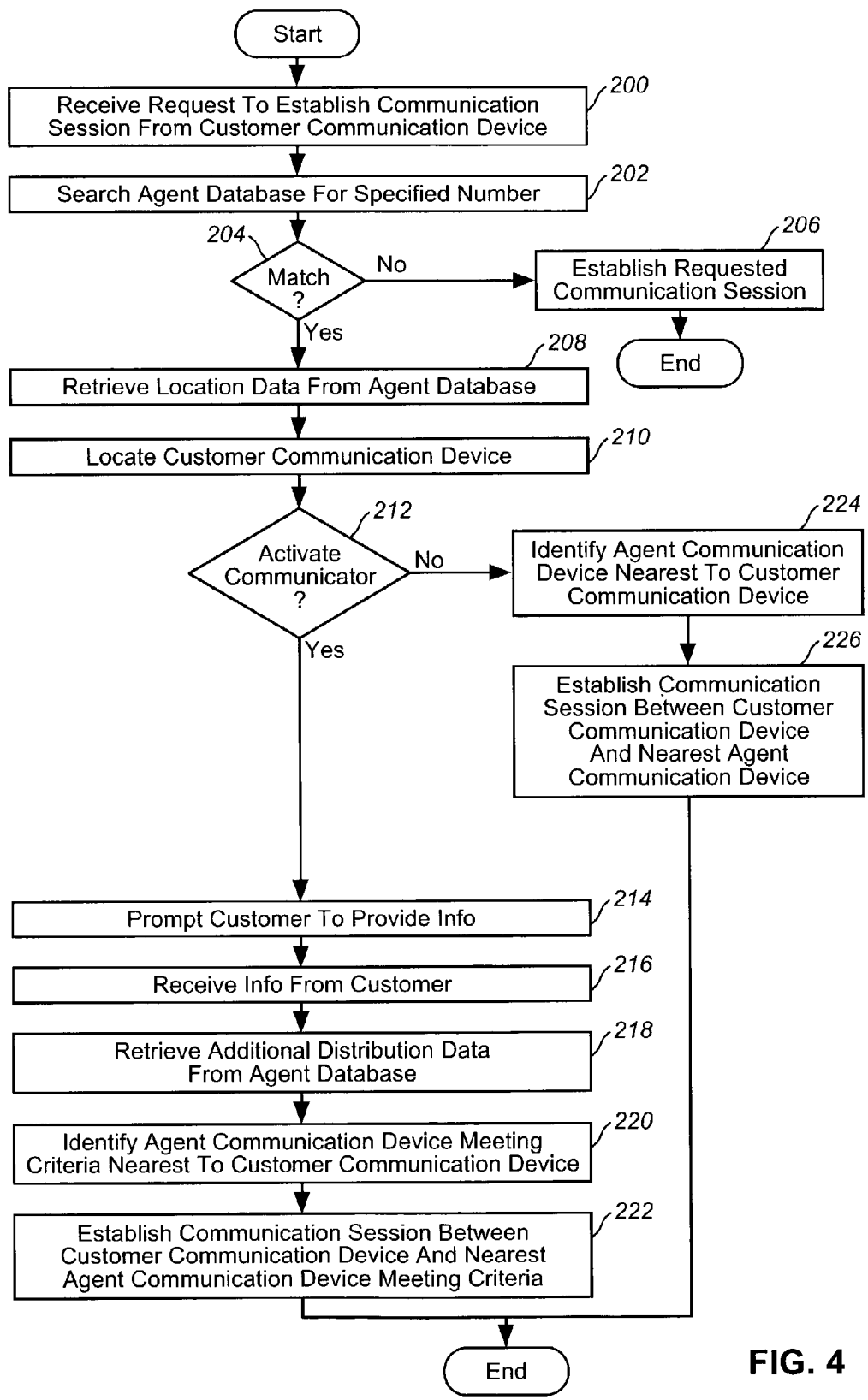
FIG. 4 is a flow diagram illustrating a method for providing location-based call distribution in the communication system of FIG. 1 in accordance with one embodiment of the present invention.

FIG. 4 is a flow diagram illustrating a method for providing location-based call distribution in the communication system 10 in accordance with one embodiment of the present invention. The method begins at step 200 where the application server 26 receives from a customer communication device 14 a request for service based on a specified telephone number. At step 202, the distributor 40 searches the agent database 28 for the specified telephone number.

At decisional step 204, the distributor 40 makes a determination regarding whether or not a match for the specified telephone number has been found in the agent database 28. If no match has been found, location-based call distribution is not being used in connection with the specified telephone number, and the method follows the No branch from decisional step 204 to step 206. At step 206, the application server 26 establishes the requested communication session, at which point the method comes to an end.

Returning to decisional step 204, if a match has been found, the method follows the Yes branch from decisional step 204 to step 208. At step 208, the distributor 40 retrieves location data 104 corresponding to the specified telephone number from the agent database 28.

At decisional step 212, a determination is made regarding whether or not to activate the communicator 44. If the communicator 44 is to be activated, the method follows the Yes branch from decisional step 212 to step 214. At step 214, the communicator 44 prompts the customer associated with the customer communication device 14 to provide information corresponding to the additional distribution data 106 stored in the agent database 28 for the specified telephone number. At step 216, the distributor 40 receives the requested information from the customer.

At step 218, the distributor 40 retrieves the additional distribution data 106 from the agent database 28. At step 220, the distributor 40 identifies the agent communication device 12 meeting the criteria of the additional distribution data 106 that is nearest to the customer communication device 14. At step 222, the application server 26 establishes a communication session between the customer communication device 14 and the nearest agent communication device 12 meeting the criteria, at which point the method comes to an end.

Returning to decisional step 212, if the communicator 44 is not to be activated, the method follows the No branch from decisional step 212 to step 224. At step 224, the distributor 40 identifies the agent communication device 12 that is nearest to the customer communication device 14. At step 226, the application server 26 establishes a communication session between the customer communication device 14 and the nearest agent communication device 12, at which point the method comes to an end.

Although the present invention has been described with several embodiments, various changes and modifications may be suggested to one skilled in the art. It is intended that the present invention encompass such changes and modifications as fall within the scope of the appended claims.

What is claimed is:

1. A method for monitoring the locations of a plurality of agent communication devices in a communication system in order to provide location-based call distribution, the method comprising:
   receiving a first location transaction from a first one of the agent communication devices;
   locating the first agent communication device in response to receiving the first location transaction;
   generating first location data for the first agent communication device based on the location of the first agent communication device; and
   storing in an agent database the first location data for the first agent communication device;
   receiving from a customer communication device a request to establish a communication session with one of the agent communication devices based on a specified telephone number;
   searching the agent database for the specified telephone number;
   retrieving location data corresponding to the specified telephone number from the agent database when the specified telephone number is found in the agent database;
   locating the customer communication device;
   identifying the agent communication device that is nearest to the customer communication device based on the retrieved location data; and
   establishing a communication session between the customer communication device and the nearest agent communication device.

2. The method of claim 1, further comprising:
   receiving a second location transaction from a second one of the agent communication devices;
   locating the second agent communication device in response to receiving the second location transaction;
   generating second location data for the second agent communication device based on the location of the second agent communication device; and
   storing in an agent database the second location data for the second agent communication device.

3. The method of claim 1, further comprising establishing the requested communication session when the specified telephone number is not found in the agent database.

4. The method of claim 1, further comprising:
   prompting a customer associated with the customer communication device to provide information corresponding to additional distribution data stored in the agent database for the specified telephone number;
   receiving the requested information from the customer;
   retrieving the additional distribution data from the agent database;
   identifying the agent communication device meeting the criteria of the additional distribution data that is nearest to the customer communication device based on the retrieved location data and the retrieved additional distribution data; and
   establishing a communication session between the customer communication device and the nearest agent communication device meeting the criteria.

5. The method of claim 1, the first location transaction comprising a self-locating location transaction.

6. The method of claim 1, the first location transaction comprising one of the first agent communication device being powered on, the first agent communication device receiving a call, the first agent communication device placing a call, the first agent communication device sending a periodic location message, a timer expiring causing a location query message to be generated for the first agent communication device.

7. A method for location-based call distribution, comprising:
   receiving from a customer communication device a request to establish a communication session with an agent communication device based on a specified telephone number;
   searching an agent database for the specified telephone number;
   retrieving location data corresponding to the specified telephone number from the agent database when the specified telephone number is found in the agent database;
   locating the customer communication device;
   identifying the agent communication device that is nearest to the customer communication device based on the retrieved location data; and
   establishing a communication session between the customer communication device and the nearest agent communication device.

8. The method of claim 7, further comprising establishing the requested communication session when the specified telephone number is not found in the agent database.

9. The method of claim 7, further comprising:
   prompting a customer associated with the customer communication device to provide information corresponding to additional distribution data stored in the agent database for the specified telephone number;
   receiving the requested information from the customer;
   retrieving the additional distribution data from the agent database;
   identifying the agent communication device meeting the criteria of the additional distribution data that is nearest to the customer communication device based on the retrieved location data and the retrieved additional distribution data; and
establishing a communication session between the customer communication device and the nearest agent communication device meeting the criteria.

* * * * *